INVENTOR
A. F. GLAUBKE
BY
ATTORNEY

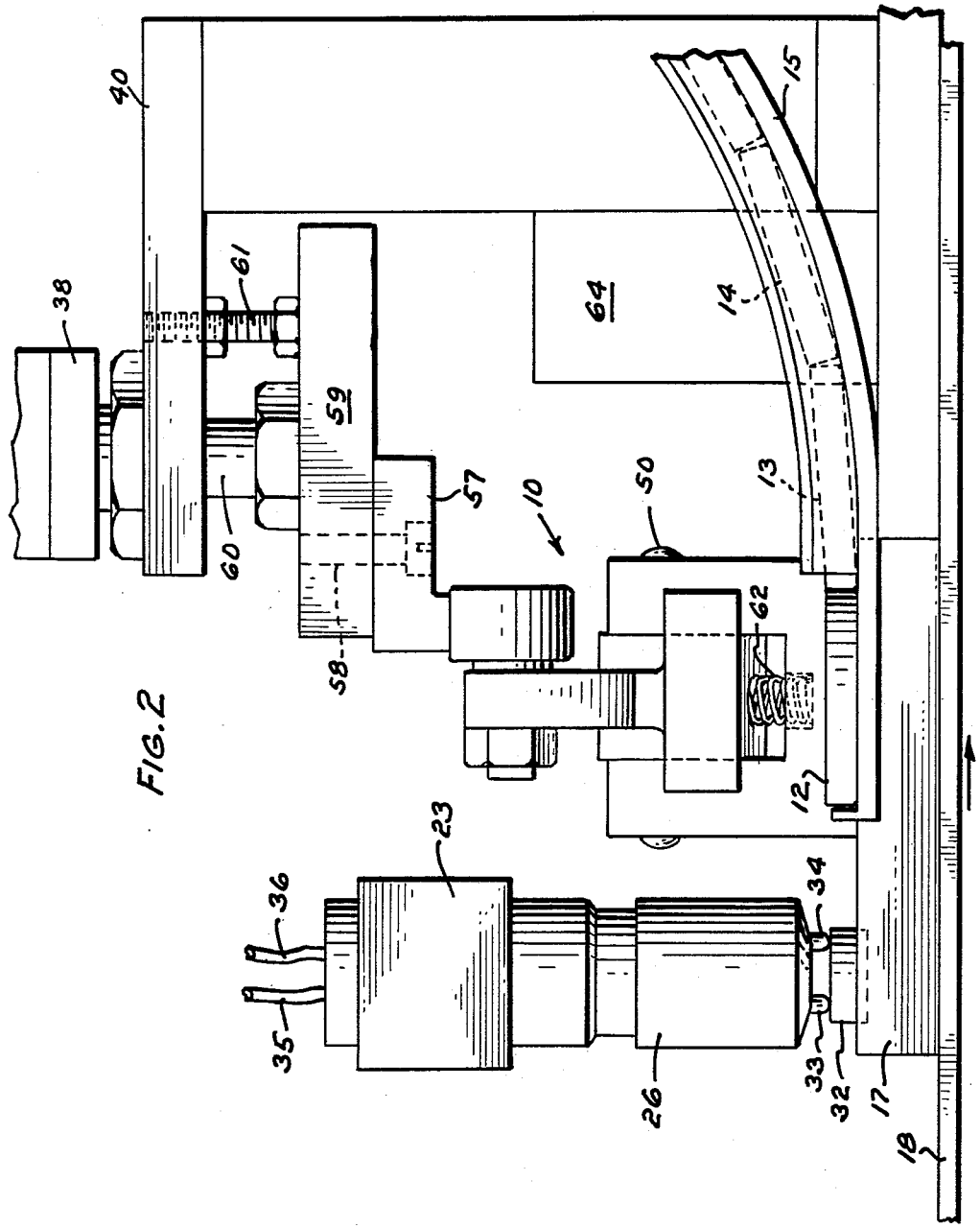

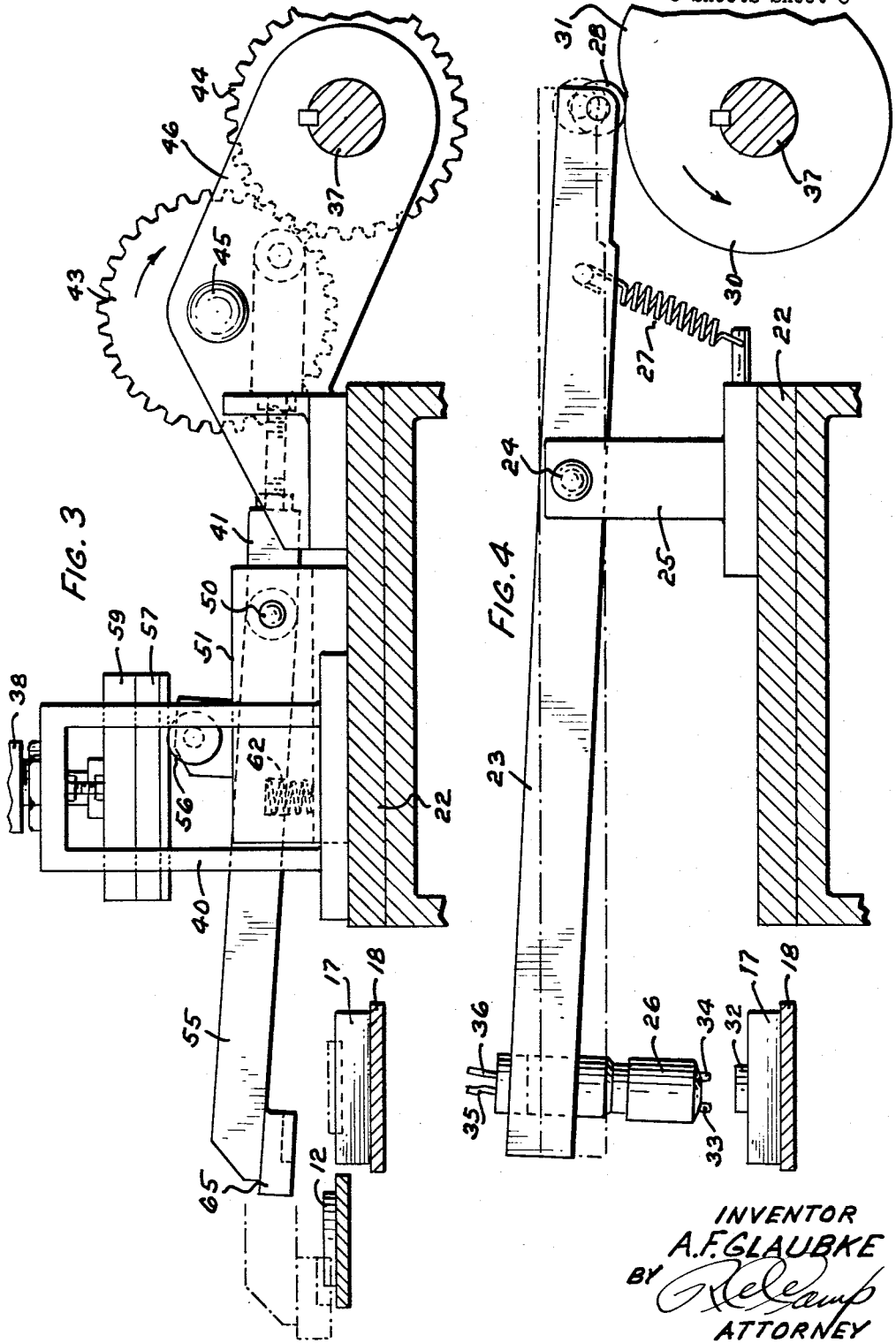

United States Patent Office 3,151,727
Patented Oct. 6, 1964

3,151,727
PART TRANSFER APPARATUS
Allen F. Glaubke, Indianapolis, Ind., assignor to Western Electric Company, Incorporated, New York, N.Y., a corporation of New York
Filed June 12, 1962, Ser. No. 201,931
3 Claims. (Cl. 198—24)

This invention relates generally to an article transfer mechanism, and more specifically to apparatus for detecting the presence of a first piece part on an assembly and for transferring a second part onto the assembly in the event the first part is so detected.

In conventional assembling operations a number of individual articles or piece parts may be successively added to the assembly during movement thereof through a series of part transfer stations. If one transfer station malfunctions it is quite possible that the final assembly will be missing the piece part that should have been supplied by that station.

It would be preferable from a manufacturing standpoint to design an assembling system such that when a piece part has not been transferred to the assembly the absence of that part would be detected by subsequent part transfer stations so that piece parts at those stations also will not be transferred to the assembly. Each transfer station would preferably consist of a part detecting device for detecting the presence of one part which should have been previously supplied to the assembly, in combination with a part transfer device for transferring a subsequent part to the assembly in the event the one part has been supplied to the assembly by a prior transfer operation.

With particular reference to the part transfer station, apparatus design considerations may dictate that the conveyor which supports the assembly during movement thereof through the series of part transfer stations be disposed for movement between the table which supports the part detecting and transfer mechanism and the mechanism for feeding successive piece parts to a position where they can be transferred by the transfer device into the assembly. In addition, it is desirable in continuous assembly operations that the transfer device for the apparatus operate as continuously as possible in order to reduce wear caused by starting and stopping.

It is broadly an object of this invention to provide apparatus that can be driven continuously in the direction of article transfer and that can be intermittently operated to transfer an article onto an assembly only in the event another article has been previously transferred onto the assembly.

More specifically, it is an object of this invention to provide apparatus which operates in a continuous reciprocating cycle in the direction of part transfer and which can be intermittently operated in a direction transverse to the reciprocative cycle to effect transfer of a piece part onto a support member if the member includes a part supplied thereto by the previous part transfer station.

Another object of this invention is to provide apparatus in accordance with the above object which, when intermittently operated, transfers the piece part from a part feeding mechanism onto the support member and thereafter releases the part in proper position on the member.

According to this invention an apparatus is provided for transferring a second part onto a member in the event a first part is being carried by the member. The apparatus includes a conveyor for transporting the member to a part transfer station in an assembly line, the conveyor being positioned between a mechanism for feeding the second part for transfer onto the member and the support for a part transfer mechanism. The transfer mechanism includes a sensing device for detecting the presence of the first part on the member and a continuously reciprocating arm which is actuated to move transversely and move the second part onto the member only when the sensing device detects the presence of the first part.

Other objects, advantages and novel aspects of the invention will become apparent upon reference to the following detailed description, taken in conjunction with the appended drawings, in which:

FIG. 2 is an end view of the apparatus constructed in accordance with the instant invention; and FIGS. 3 and 4 are side views of the part transfer mechanism and of the part detecting device, respectively.

Figure 1:
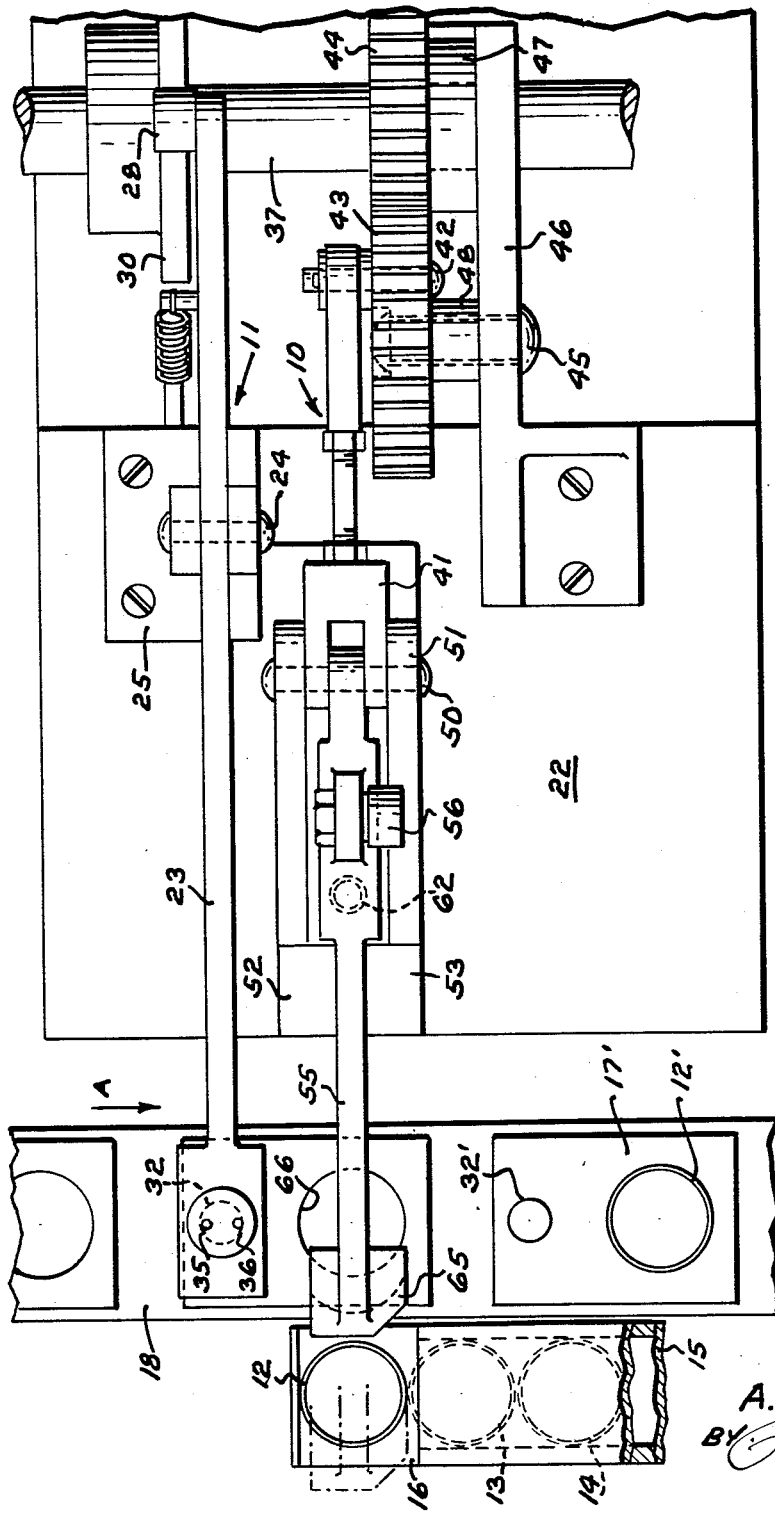
FIG. 1 is a plan view of the apparatus of this invention with certain elements removed for the purpose of clarity.

Referring now to the drawings for a more complete understanding of the invention, FIGS. 1 and 2 show a piece part or article transfer device 10 and a sensing device 11, the combination thereof forming the part transfer mechanism of this invention. Piece parts such as disks 12, 13 and 14, or like components, issue successively from a chute 15 to a piece part feeding station indicated by the numeral 16 where the parts from the chute 15 are positioned for transfer onto the support member 17 which may form the base component of an assembly. The member 17 is composed of an electrical insulating material and is intermittently advanced to a position adjacent the station 16 by an endless conveyor 18 traveling in the direction of the arrow A. Numeral 17' refers to another support member previously placed on the fixture conveyor 18, having a ferrule 12' properly seated thereon, the member 17' being essentially identical to the member 17.

As shown in FIG. 4 the sensing mechanism 11 is mounted on a table 22 positioned adjacent the conveyor belt 18 and comprises an arm 23 pivotally mounted by a pin 24 to a bracket 25 secured to the table 22. A probe 26 is fastened to one end of the arm 23 and a roller 28 is rotatively mounted on the other end of the arm 23. A coil spring 27 is connected to the arm 23 intermediate the roller 28 and the pin 24 and to the bracket 25 and urges the probe 26 from contact with the part 32. The roller 28 rides upon a cam 30 having a cam lobe 31 thereon which produces counterclockwise pivotal movement of the arm 23 about the pin 24 driving the probe 26 downwardly and into contact with a metallic part 32 which was seated in the member 17 by a previous transfer operation. The part 32' on the article 17' is essentially identical to the part 32 on the member 17.

The cam 30 is keyed to a shaft 37 which rotates continuously, the lobe 31 being positioned with respect to the shaft 37 so that the probe 26 is driven into contact with the metal part 32 during the interval when the conveyor 18 is stationary. The probe 26 is driven from contact with the arm 23 and the bracket 25 when the roller 28 rides off of the lobe 31 by the contraction of the spring 27. The peripheral length of the lobe 31 is such that the roller 28 rides off the lobe prior to further intermittent movement of the conveyor 18.

The probe 26 may for example comprise a pair of electrical contacts 33 and 34 that are electrically insulated from the probe housing and terminate in leads 35 and 36 respectively, the leads 35 and 36 being connected in circuit with a relay and a battery source (not shown) for energizing an actuator 38 which may for example take the form of a solenoid. The actuator 38 is mounted on the part transfer mechanism 10 for actuating the mechanism 10 if a part, as for example the metal part 32, is present on the member 17. The metal part 32 will serve to bridge the gap between the contacts 33 and 34 thereby closing the relay (not shown) sot that the actuator 38 is energized.

Referring now to FIGS. 2 and 3, the transfer mechanism 10 mounts the actuator 38 on a support member 40 secured to the table 22. A yoke member 41 having one end thereof eccentrically connected by a pin 42 to a pinion 43 which continuously rotates in the direction indicated by the arrow as a result of meshing with a continuously rotating gear 44 keyed to the shaft 37. The pinion 43 is mounted for rotation on a shaft 45 extending from a bracket 46 secured to the table 22, the bracket 46 also mounting the shaft 37 for rotation. Collars 47 and 48 serve to space the gears 43 and 44 from the bracket 46. The bifurcated end of the yoke 41 is journaled on a pin 50, the end of the pin 50 being fastened in a U-shaped slide 51, FIG. 1, slidable in guideways 52 and 53 formed in the table 22 so that reciprocative movement of the yoke 41 produces reciprocative movement of the slide 51 and of an arm 55 journaled on the pin 50.

With reference to FIG. 3, the arm 55 mounts a roller 56 for rotation against the surface of a block 57 which is driven transversely of the arm 55 by the actuator 38. The block 57 is secured by machine screws 58 to a plate 59, the plate 59 being fastened to a drive rod 60 extending from the actuator 38. A stud 61 is fastened to the support 40 and abuts one side of the plate 59 thereby limiting upward vertical movement of the block 57. A block 64 is positioned to abut the other side of the plate 59 and thereby limits vertical downward movement of the block 57.

A coil spring 62 is seated in the bottom of the slide 51 and in the arm 55 and biases the arm 55 clockwise as viewed in FIG. 3, about the pin 50 so that the roller 56 is biased against the flat surface provided by the block 57.

The forward extremity of the arm 55 is formed with a member 65 designed to pull the part 12 onto the member 17, the part 12' (FIG. 1) being shown seated in a corresponding circular recess provided in the member 17'. The member 65 will be pivoted downwardly by downward movement of the block 57 during retraction thereof to move a part onto the conveyor 18 if the actuator 38 is energized, the limit of retractive movement of the arm 55 being established at the position where the member 65 will have moved the part to a position where it can drop into the recess 66. The length of the stroke of the arm 55 is governed by position of the pin 42 on the pinion 43, the arm 55 normally reciprocating between the limits indicated by the solid and phantom lines in FIG. 3.

To summarize briefly the operation of the transfer device described hereinabove, the conveyor 18 translates intermittently to present successive support members such as the member 17 with the recess 66 opposite the station 16 for receiving piece parts from the chute 15. The cam lobe 31 is positioned on the cam 30 so that lobe acting against the roller 28 causes the probe 26 to contact the part 32 which has been previously seated in the member 17 as soon as the conveyor 18 stops. If the part 32 is seated in the member 17 the actuator 38 will be energized by the completion of an electrical circuit (not shown) through the probe 26 and the part 32. Since the arm 55 is driven by rotation of the pinion 43 as the arm 55 reaches the limit of forward advancement the block 57 will be driven by energization of the actuator 38 causing the member 65 to pivot to the position shown by the phantom lines in FIG. 3.

The actuator 38 remains energized until the roller 28 rides off of the lobe 31, the lobe having a length great enough to maintain the actuator 38 energized until the member 65 retracts and moves the part 12 over the recess 66 whereupon the part 12 falls into that recess. Upon forward return movement of the arm 55 the actuator 38 is de-energized and the spring 62 expands causing pivotal movement of the arm 55 to the position shown by the solid lines in FIG. 3.

In the event the part 32 has not been previously seated in the member 17 the probe 26 will contact only the insulated member 17 and the actuator 38 will not be energized. The arm 55 will thereupon merely reciprocate above the part 12 at the station 16 and the member 17 will be transferred by further indexing of the conveyor 18 without the part 12 having been transferred thereto.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. Apparatus for transferring a second part onto a support member in the event a first part is being carried by the member, the apparatus comprising:

means for transporting the support member to a part transfer station, means for feeding the second part to a position adjacent the means for transporting the support member, sensing means at the station for detecting the presence of the first part on the support member, transfer means mounted for reciprocative and transverse movements over the station positioned to engage the second part upon successive forward and transverse movements thereof, means for driving said transfer means, and means in circuit with said sensing means and energized as a result of said sensing means detecting the first part on the support member for producing transverse movement of said transfer means so that the second part is transferred onto the member upon retraction of said transfer means.

2. Apparatus for transferring a second part onto a support member in the event a first part is being carried by the support member, the apparatus comprising:

means for transporting the support member to a part transfer station, means for feeding the second part to a position adjacent the means for transporting the support member, sensing means at the station for detecting the presence of the first part on the support member, transfer means mounted for reciprocative movement to advanced and retracted positions and for transverse movement over the station, said transfer means engaging the second part as a result of being moved transversely while in the advanced position, means for driving said transfer means reciprocatively, means in circuit with said sensing means and energized as a result of said sensing means detecting the presence of the first part on the support member for driving said transfer means transversely for a period in the reciprocating cycle so that the second part is transferred onto the member upon subsequent movement of said transfer means to the retracted position, and means for resiliently biasing said transfer means from the second part during reciprocation.

3. Apparatus for transferring a second part onto a support member in the event a first part is being carried by the member, the apparatus comprising:

means for transporting the support member to a part transfer station, means for feeding the second part to a position adjacent the means for transporting the support member, sensing means at the station for detecting the presence of the first part on the support member, an arm for moving the second part onto the support member, a slide mounting said arm for reciprocative movement to advanced and retracted positions and for pivotal movements with respect to the second part, means for driving said slide and arm reciprocatively, resilient means mounted in said slide for biasing said arm from engagement with the second part during reciprocation, a block mounted for movement transversely of said slide for driving said arm into engagement with the second part when said arm is in the advanced position, and means in circuit with said sensing means and energized as a result of said sensing means detecting the first part on the support member for driving said arm transversely for a period in the reciprocating cycle so that the second part is moved onto the support member upon subsequent retraction of said arm.

References Cited in the file of this patent
UNITED STATES PATENTS

| | | |
|---|---|---|
| 1,638,310 | Killebrew | Aug. 9, 1927 |
| 2,547,791 | Smith | Apr. 3, 1951 |
| 2,852,123 | Heidergott | Sept. 16, 1958 |
| 2,884,114 | Oberwelland | Apr. 28, 1959 |